United States Patent [19]

Waldron

[11] Patent Number: 4,992,206

[45] Date of Patent: Feb. 12, 1991

[54] AEROSOL GENERATOR APPARATUS AND METHOD OF USE

[76] Inventor: J. David Waldron, Valdosta, Ga.

[73] Assignee: Lowndes Engineering Co., Inc., Valdosta, Ga.

[21] Appl. No.: 265,527

[22] Filed: Nov. 1, 1988

[51] Int. Cl.[5] .......................... B05B 7/10; C09K 3/30

[52] U.S. Cl. .......................... 252/305; 239/77; 239/86; 239/403; 239/405; 261/78.2; 424/43; 424/405

[58] Field of Search .................. 252/305; 424/43, 405; 239/77, 86, 338, 403, 405; 261/18.1, 78.2

[56] References Cited

U.S. PATENT DOCUMENTS

| | | | |
|---|---|---|---|
| 1,451,063 | 4/1923 | Anthony | 239/405 |
| 2,047,570 | 7/1936 | Wiltshire | 239/405 |
| 3,552,652 | 1/1971 | Greenwood | 239/77 |
| 3,702,306 | 11/1972 | Waldron | 252/305 |
| 4,111,364 | 9/1978 | Schroeder | 239/77 |
| 4,288,036 | 9/1981 | Jubinville | 239/346 X |

FOREIGN PATENT DOCUMENTS

| | | | |
|---|---|---|---|
| 2813490 | 10/1978 | Fed. Rep. of Germany | 239/77 |

*Primary Examiner*—Richard D. Lovering
*Attorney, Agent, or Firm*—Hurt, Richardson, Garner Todd & Cadenhead

[57] ABSTRACT

An aerosol fogging generator is disclosed having a prime mover and blower for delivering air through a duct system to a nozzle assembly. A fluid introduction system is provided to introduce fluids into the nozzle assembly for dispersal as a fog into the atmosphere. A passage provided between the fluid introduction system and the duct system provides for a cut off of the fog produced by the generator in a matter of seconds.

15 Claims, 3 Drawing Sheets

AEROSOL GENERATOR APPARATUS AND METHOD OF USE

BACKGROUND OF THE INVENTION

Many of the current generation of foggers used for spraying or dispersing pesticides, defoliants, fungicides and other chemicals are known as ultra low volume (ULV) cold aerosol generators or fog generators. Such devices normally include a prime mover, a blower unit, a nozzle assembly, and a supply tank for the chemical as well as a suitable control means. The chemical is normally fed into the nozzle assembly where it is entrained in the air stream flowing therethrough and dispersed into the atmosphere. The generators are also normally self-contained units and are removably mounted in or on a vehicle, utilizing, for example, skids or similar platforms.

One common use is to mount the generator on a truck or similar vehicle for use in spraying pesticides in residential areas. As such, the generator must be shut down and the supply disconnected when the vehicle stops at stop lights, stop signs, etc. since the concentrated pesticide can be detrimental to humans, automobile finishes, etc. Regulations governing the use of and dispersion of the pesticides or other chemicals propagated by the Environmental Protection Agency and many municipal and state governmental agencies require that the spray be completely stopped in a matter of seconds upon stopping the vehicle.

Prior art generators are, in general, able to cut off the spray; however, a complete stoppage has taken several minutes as the normal procedure is to leave the blower and motor on while cutting off the fluid supply, since restarting the motor requires that the operator get out of the vehicle and pull the starter rope on the motor. The vacuum created by the still-operating blower draws the fluid out of the supply line and, in some cases, out of the supply tank resulting in a continuous, albeit reduced, spray being emitted. Thus, there is a definite concern which, prior to the present invention, has not been addressed.

SUMMARY OF THE INVENTION

It is therefore, one of the principal objects of the present invention to provide an aerosol generator for dispersing pesticides, herbicides, and other chemicals, that can be cut off by the operator using a remote control switch, the generator effecting a complete cut off of the fog in a matter of seconds.

Another object of the present invention is to provide an aerosol generator capable of delivering minute quantities of concentrated active ingredient over a large area.

A further object of the present invention is to provide a system for essentially instantaneously stopping the chemical fog produced by the generator and which is easily applied to retrofit existing aerosol generators.

These and additional objects are attained by the present invention which relates to an aerosol fog generator having a prime mover, a blower assembly, and one or more nozzle assemblies, into which a suitable chemical is introduced for dispersal over a wide area. The chemical is dispersed in droplets having a size ranging from approximately five to twenty microns. The generator is normally mounted in or on a vehicle and includes a remote control switch means in the vehicle cab which the operator utilizes to start or stop the flow of the chemical into the nozzle assembly. Upon switching the flow off, the fog produced is essentially instantaneously halted, the cut off occurring in a matter of seconds.

Various additional objects and advantages of the present invention will become obvious from the following detailed description, with reference to the accompanying drawings.

BRIEF DESCRIPTION OF THE DRAWINGS

FIG. 1 is a perspective view of the present aerosol fog generator, shown installed on a skid for removably mounting the generator in a vehicle or the like;

DETAILED DESCRIPTION OF THE PREFERRED EMBODIMENT

Figure 1:
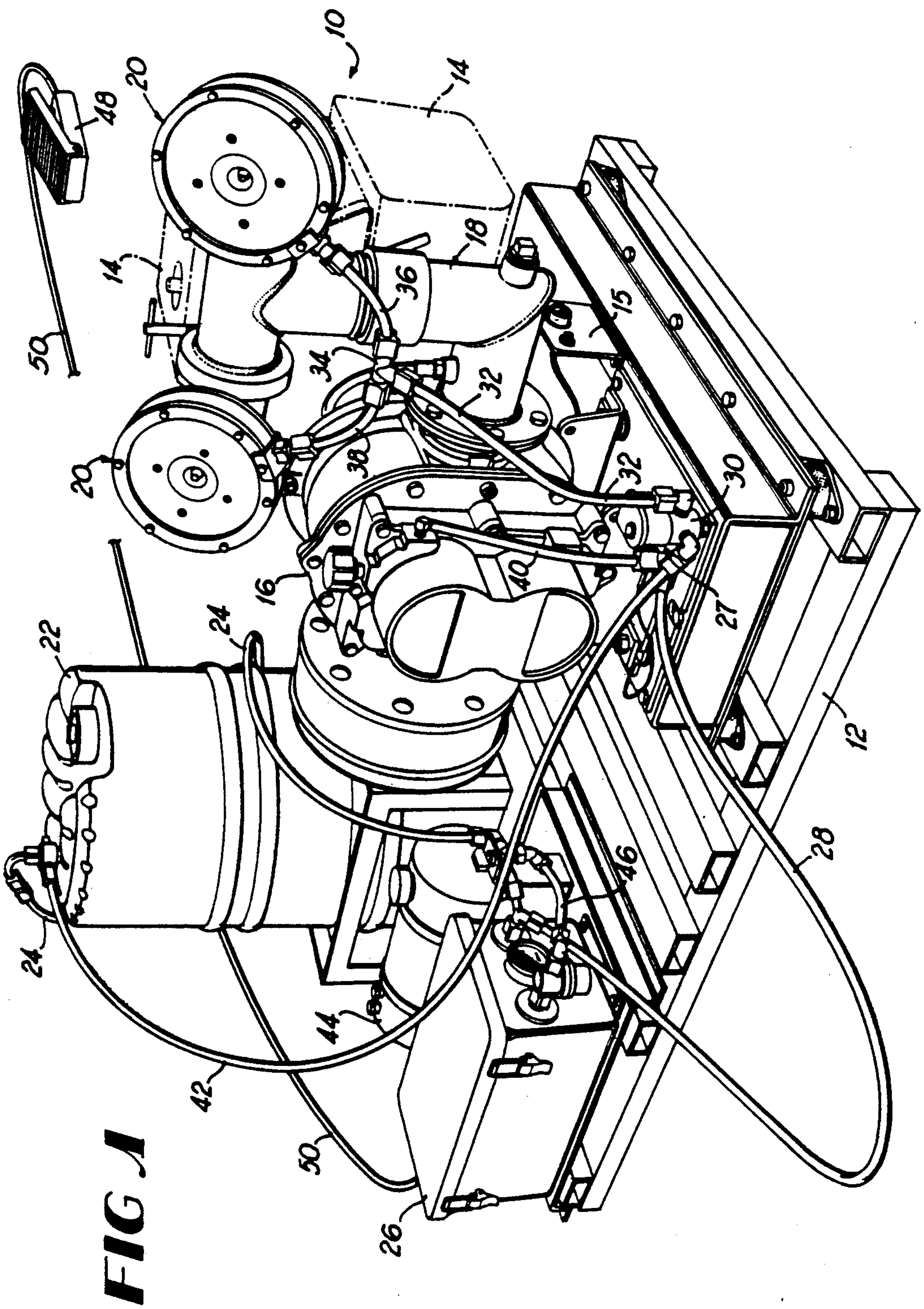

Referring now more specifically to the drawings, and to FIG. 1 in particular, numeral 10 designates generally the aerosol fog generator, shown mounted on a skid 12 for removably mounting the generator in a vehicle or the like (not shown). The unit is normally powered by a conventional prime mover 14 having a starter control 15, the prime mover being typically gasoline engine or electric motor. The engine powers a positive displacement blower 16, a suitable model being capable of moving 250 cu. ft/min of air at a pressure of 8 p.s.i. A typical application of pesticide for mosquito control delivers 4.3 fl. oz/min at 4–6 p.s.i. through a single spray nozzle, with a vehicle speed of 10 m.p.h. A typical application with the two nozzle unit shown in FIG. 1 delivers 8 oz. of pesticide (4 oz. per nozzle) at 7 p.s.i. with a vehicle speed of 10 m.p.h.

The output of the blower 16 is delivered through duct assembly 18 to the spray nozzle assemblies 20. The generator shown here includes two nozzle assemblies; however, the unit may be equipped with a single nozzle or may include more than two, depending on the particular application for which the generator is used.

The chemical is stored in supply tank 22 and is delivered therefrom through conduit 24 to a flow control unit 26. The flow control unit is calibrated to deliver the desired amount of fluid through conduit 28 and a suitable connection fitting 27 to a normally closed, 3-way solenoid valve 30. From valve 30, the fluid is delivered through conduit 32 to connector 34, which in this embodiment, is a T-shaped fitting which delivers the fluid to the nozzle assemblies through conduits 36 and 38.

Extending upwardly from the connection fitting 27 is a surge protector line 40 which effectively serves as a safety line against unexpected fluid surges, line 40 normally being empty A fluid return line 42 extends from the solenoid valve 30 back to the supply tank 22. The generator unit is also supplied with an auxiliary tank 44 which contains a suitable solvent or similar fluid for flushing the unit after use. The solvent is delivered through conduit 46 to the flow control unit 26 and from there follows the same path as the pesticide or other chemical through the conduit 28 to the solenoid valve. The solvent is pumped through the conduit 32 and is blown through the nozzle assemblies for cleaning the nozzles.

The flow control unit is activated by a remote control switch means 48, which is normally mounted in the vehicle cab, being connected to the flow control unit by cable 50.

Figure 2:
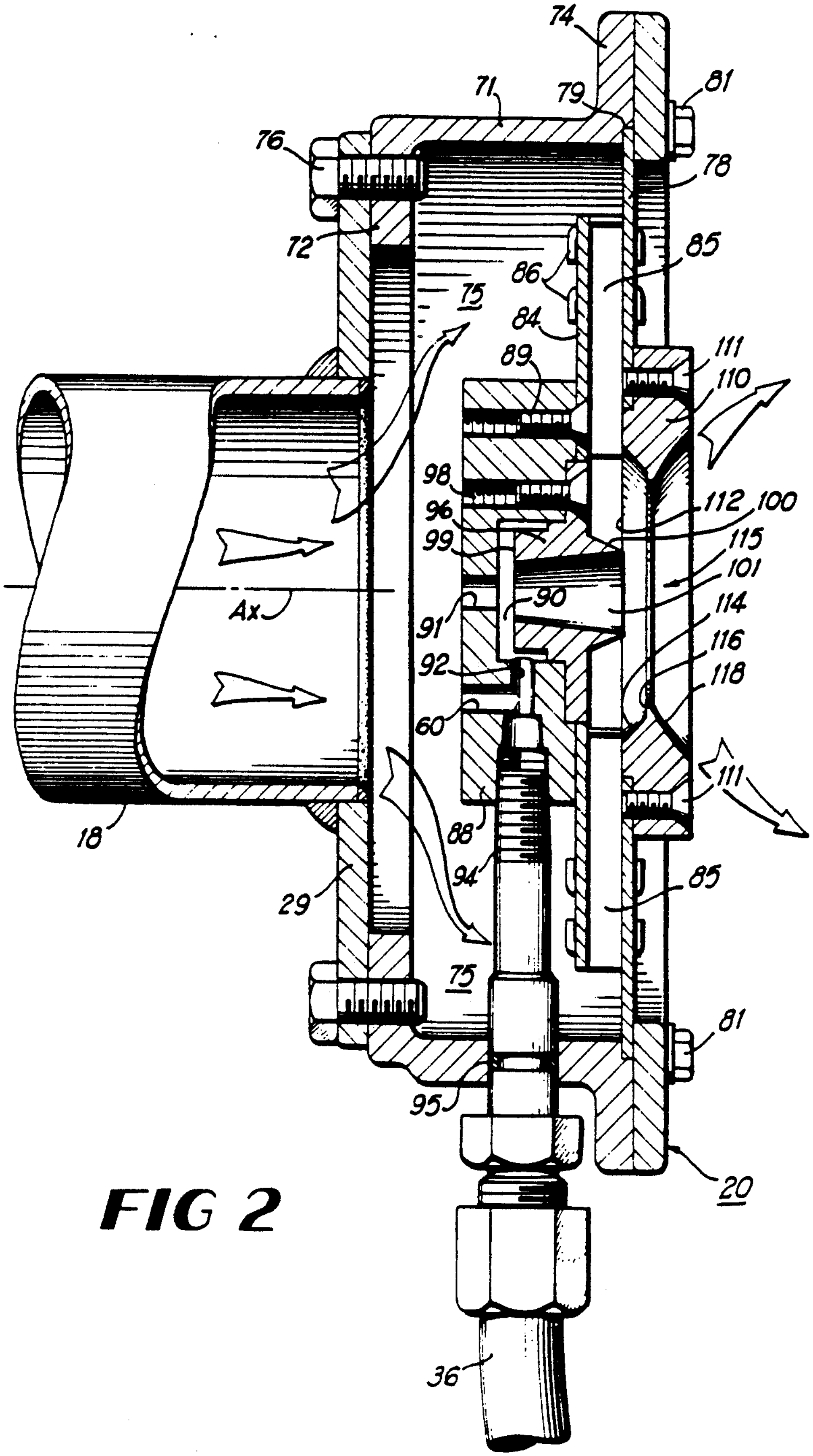
FIG. 2 is a cross-sectional view of one of the nozzle assemblies of the generator, the section being taken on line 2—2 of FIG. 1.

Referring to FIG. 2, a detailed cross section of the nozzle assembly is illustrated. The nozzle assembly is essentially similar to that shown in U.S. Pat. No. 3,702,306 for a Fogging Method and Apparatus which is commonly owned with the present application, and portions of which are incorporated herein by reference.

Referring more specifically to FIG. 2, it will be seen that the nozzle assembly 20 includes an annular housing 71 having an inwardly directed mounting flange 72 at the left or inlet end as seen in FIG. 2 and an outwardly directed positioning flange 74 at the discharge or right end thereof as seen in FIG. 2. The housing 71 defines an air receiving chamber 75 therein closed at the inlet end thereof by mounting flange 29 connected to the mounting flange 72 through appropriate bolts 76 and partially closed at the discharge end thereof by an annular positioning plate 78. The positioning plate 78 is received in an appropriately formed recess 79 in the forward edge of housing 71 by nut and bolt assemblies 81. The positioning plate 78 is washer-shaped providing a central aperture therethrough.

A secondary positioning plate 84 which is also washer shaped but having a smaller outside and inside diameter is positioned behind the plate 78 toward the inlet side of the housing 71 by a plurality of arcuate shaped vanes 85 which are arranged along a spiral path relative to the axis AX of nozzle assembly 20. The vanes 85 are connected to plates 78 and 84 through locking tabs 86. The inside passage through secondary positioning plate 84 is closed by a mounting block 88 connected to plate 84 through screws 89 extending from plate 84 toward the chamber 75 and the inlet end of housing 71.

Block 88 is made of plastic or some other non-corrosive material and defines a centrally located fluid recess 90 therein extending into block 88 from the discharge side of housing 71. A centrally located, axially extending passage 91 is also defined through block B8. Passage 91 is centrally located with respect to recess 90 and communicates with chamber 75 at one end thereof and with recess 90 at the other end thereof. Hose 36 supplying fluid to the nozzle assembly 20 communicates with recess 90 in the block 88 through a radially extending port 92 communicating with the recess 90 and with hose 36 through appropriate fitting 94 connected to block 88 through housing 71. To prevent seepage and to aid in sealing chamber 75, a VITON O-ring 95 is provided around fitting 94. Therefore, it will be seen that fluid supplied through the hose 36 will be supplied to the recess 90. It will also be seen that part of the air supplied into chamber 75 through duct 18 will be supplied through passage 91 to the recess 90.

A nozzle plate 96 having an outside diameter coinciding with the inside diameter of the plate 84 and received in positioning recess in the face of the block 88 adjacent to the discharge side of the housing 71 partially closes the recess 90 in block 88. The nozzle plate 96 is maintained in position on the block 88 by a plurality of screws 98. The nozzle plate 96 defines an outstanding collar 99 extending from one side of the plate 96 toward the inlet side of housing 71 to a position spaced from the bottom of recess 90 when the plate 96 is in position. The outside of the plate 96 is adjacent to the discharge side of housing 71 and is concentrically located about axis AX. A nozzle passage 101 is defined through the plate 96, collar 99, and nozzle flange 100. This nozzle passage 101 is concentrically located with respect to the axis AX and is larger in diameter than the passage 91 through the block 88. A deflection member 110 is carried on the discharge side of plate 78 and reduces the effective diameter of the central aperture therethrough. The deflection member 110 is maintained in position by screws 111 engaging plate 78 and positions the member 110 so that the inside surface thereof is in alignment with the forward surfaces of vanes 85 extending toward the discharge side of housing 71. Member 110 defines an inwardly tapering annular surface 112 concentric about axis AX. Surface 112 begins just inwardly of the inner ends of vanes 85 and extends toward the discharge side of nozzle assembly 20 to terminate in an annular surface 114 concentric with axis AX. Surface 114 terminates in an annular knife edge 116 defining a passage 115 aligned with axis AX and appreciably larger than passage 101 and spaced forwardly thereof. While the exact dimensions and proportions of the same may vary with different fluids and conditions, it has been found that a passage 101 that is 7/10 inch in diameter with passage 115 being 1 1/16 inches in diameter and spaced from flange 100 about 3/16 inch produces a satisfactory operation. An outwardly flaring concave annular surface 118 extends from edge 116 to the discharge side of member 110 and is concentric with axis AX.

As air under pressure is supplied through duct 18 as indicated by the solid line arrows in FIG. 2, it enters chamber 75 in housing 71 of the nozzle assembly 20. While air may be supplied under different pressures to assembly 20, it has been found that a pressure range of 2 to 7 p.s.i. is adequate. A certain percentage of this air is forced through passage 91 and 101 along an axial path along axis AX. The remainder of the air, a larger percentage than that passing along the axis path, is forced outwardly as indicated in chamber 75 and then inwardly through the passages defined between vanes 85 along a plurality of circumferentially spaced spiral paths perpendicular to axis AX. While conditions may require the percentages of the total air from duct 18 passing along the axial and spiral paths to be varied, one embodiment of the invention wherein approximately 99% of the air, passes along the spiral paths as the primary stream and 1% of the air passes along the axial path as the secondary stream has been found adequate.

The desired amount of active ingredient fluid from tank 22 is metered into recess 90 and passage 101 as indicated by the dashed line arrows in FIG. 2 through port 92. As the fluid enters passage 101, it expands thereby insuring that the active ingredient fluid will be picked up by the secondary air stream. The fluid then forms an ultra thin film around the passage 101 as it moves along said passage.

At the same time, the spiraling air streams expand as they reach the surface 112 and are then directed inwardly across the discharge end of nozzle flange 100 by surface 114. As these spiralling air streams strike the outside tapering surface of nozzle flange 100 and also the opposing spiralling air stream, an axially directed component of movement is imparted hereto. As the spiralling primary air streams shear the fluid film into droplets, these droplets of fluid are entrained therein as the air streams pass over the surface 118 to form an outwardly diverging fog. The axial air stream and surface 118 impart a further axially directed component of movement to the outwardly spiralling mixture of atomized fluid and air. This arrangement provides adequate dispersion for very low fluid flow rates of less that 0.7 fluid ounces/min. to more than 5.7 fluid ounces/min.

with excellent carrying distances of 600 feet under low wind conditions (2.5 m.p.h.) to over 1 mile under high wind conditions (6–8 m.p.h.) when the axis AX of the nozzle assembly 20 is parallel to the ground.

In addition to the above-described nozzle assembly, and according to the present invention, a passage means, such as passageway 60 is formed through block 88 and communicates with chamber 75 at one end thereof and with the fluid port 92 at the other end. Thus, while the fluid is being introduced into the nozzle assembly, the air forced through passageway 60 effectively forms a tertiary air stream and serves to aid in the introduction of the fluid to recess 90 and passage 101. This tertiary stream also becomes entrained with the fluid, causing at least a partial atomization of the fluid and aiding in its dispersal throughout the nozzle assembly where it is then picked up by the primary and secondary air steams as described.

Upon energization of the solenoid valve 30 by the operator, and in conjunction with the cut off of fluid through the flow control unit 26, also by the operator, the solenoid valve closes conduit 28 at the solenoid valve and opens the passage through the solenoid valve which communicates with return conduit 42. This provides an open passageway from passageway 60 through port 92, fitting 94, through conduits 36, 38, and 32, through the valve 30, and through conduit 42 back to the supply tank 22. Thus, the blower, acting through passageway 60, forces any fluid remaining in the conduits back into the supply tank, effecting a complete shut-off of the fog. The stoppage occurs essentially instantaneously upon the solenoid valve closing the supply conduit and opening the return line. Any fluid remaining around the passage 101 is expelled simultaneously with the just-described shut-off, as the blower continues to operate during the entire operation. Thus at most, the remainder of the ultra thin film coating passage 101 is all that is expelled following the shut off. Complete stoppage of any fog or mist occurs within a matter of seconds, and in testing the device, is found to occur in three seconds or less, depending on the particular chemical.

It will be evident from the above description that the same procedure used to introduce and to stop the flow of the chemical being dispersed is used with the solvent or cleaning fluid. In addition, the method of operation is also believed evident from the description of operation just presented.

Figure 3:
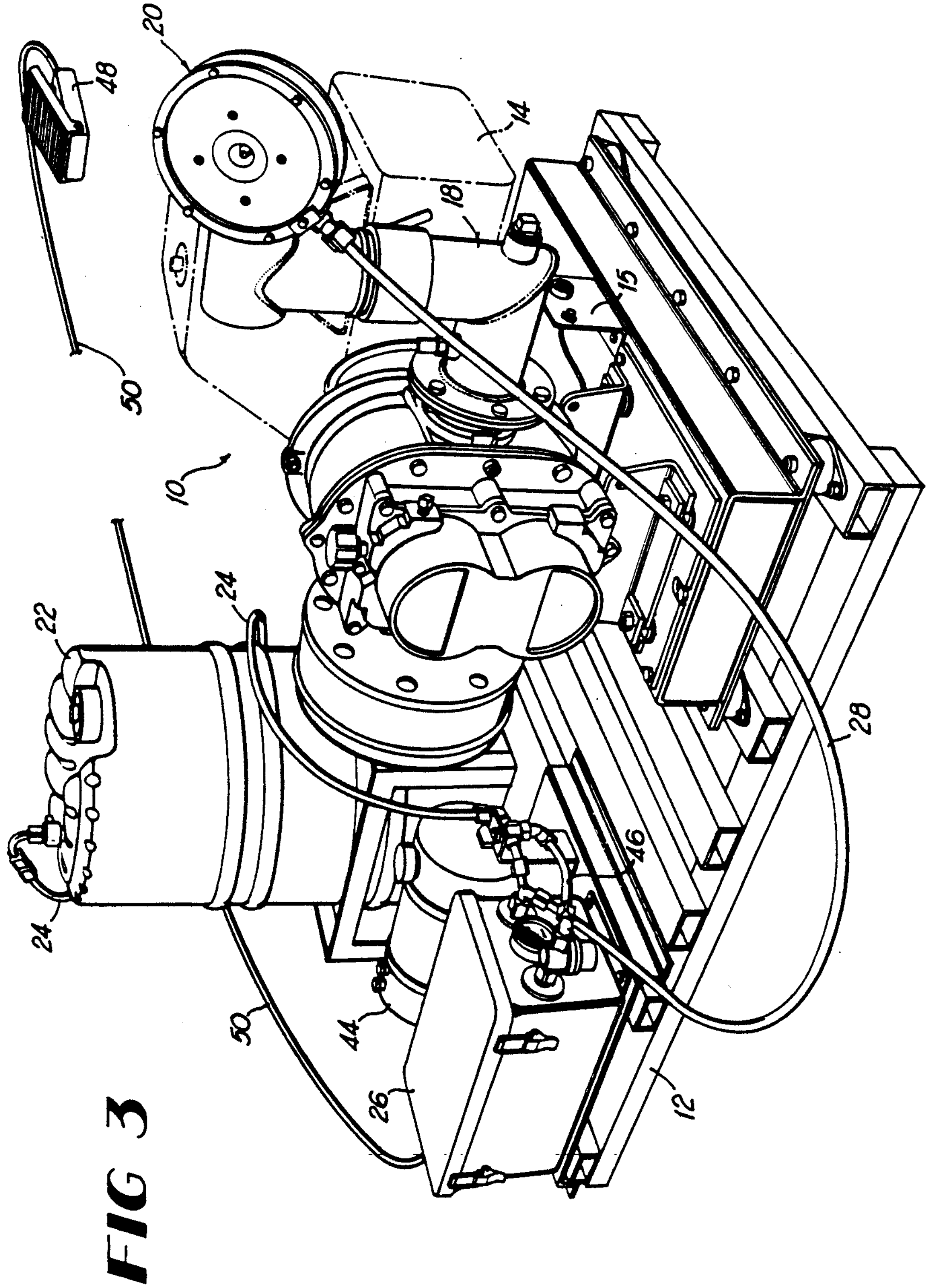
FIG. 3 is a perspective view of an alternate embodiment of the present invention.

Referring now to FIG. 3, a modified version of the present invention is illustrated, the embodiment of FIG. 3 being essentially similar to that shown in FIG. 1 except that a single nozzle assembly 20 is used as opposed to the dual assembly of FIG. 1 and the solenoid valve 30 is not used. The nozzle assembly itself is identical to that illustrated in FIG. 2. Similar numerals are utilized for like parts.

In the embodiment of FIG. 3, the single nozzle assembly 20 is supplied with fluid directly from the flow control unit 26 through conduit 28. Since there is no need to split the supply line to feed multiple nozzle assemblies, there are fewer fluid lines required and, consequently, less of the chemical suspended in the supply lines which could be pulled through the system and expelled to the atmosphere by the vacuum created by the operation of the blower.

In most other respects, operation of the two units is basically the same, with the flow control unit supplying either a chemical pesticide or the like, or a cleaning solvent to the nozzle assembly. The blower 16, powered by the prime mover 14, forces air through direct assembly 18 to the nozzle assembly to disperse the active ingredient.

Referring still to FIG. 3, the flow control unit is controlled by the operator, normally from the vehicle cab, and pumps fluid through conduit 28 to the nozzle assembly. When the operator wishes to cut off the fog being produced, the flow control unit is deactivated and with fluid no longer being supplied, air from the blower is forced through passageway 60 and port 92, into fitting 94 where the air holds the fluid in the conduit 28 due to the air pressure being greater than the fluid pressure. This procedure also cuts off the fogging action in a matter of seconds, thus providing greatly increased safety in the use of the chemicals and also compliance with local, state and federal guidelines which regulate the use of the chemicals. Eventually, the relatively large pressure differential between the air and fluid pressures would force the fluid in conduit 28 back through the flow control unit to the supply tank; however, in practice, the flow is normally only stopped for short periods, such as while the vehicle is stopped for a traffic signal, and thus it is sufficient that the fluid be held in the supply conduit. Upon reactivation of the flow control unit, the fluid is again positively introduced or pumped into port 92 where it is dispersed through the nozzle assembly as described hereinabove.

While operation of the unit shown in FIG. 3 provides the fast, positive cut off of chemical fog, it is to be understood that the embodiment shown in FIG. 3 can also utilize the solenoid valve 30 as shown in FIG. 1 and the associated supply and return lines. Conversely, the embodiment illustrated in FIG. 1 could be supplied with a single nozzle assembly, or with more than two nozzle assemblies as noted hereinabove.

In both embodiments illustrated, a suitable interlock is provided (not shown) which prevents activation of the flow control unit 26 by the control means 50, unless the prime mover and blower are also operating, thus adding to the efficiency and the safety of the present invention. The nozzle assemblies can also be rotated and/or swiveled to aim the fog in any desired direction.

Thus, while an embodiment of an aerosol generator apparatus and method of use and modifications thereof have been shown and described in detail herein, various other changes and modifications may be made without departing from the scope of the present invention.

I claim:

1. An aerosol generator for dispensing fluid in a primary air stream to form a fog having finely divided droplets of said fluid entrained therein comprising an air blower means for producing a primary air stream, duct means connected to said blower means and including an outlet end, a nozzle assembly having a housing and a discharge means for discharging said fog, said housing defining an air receiving chamber communicating with said outlet end and said discharge means, a block enclosed in said housing, said block defining a first passage for introducing a secondary air stream into said fluid, said first passage communicating with said air receiving chamber and said discharge means, said block defining a fluid receiving chamber communicating with said first passage, said block defining a second passage communicating between said air receiving chamber and said fluid receiving chamber fluid introduction means connected to said fluid receiving chamber for introducing fluid therein, said second passage directing a tertiary air stream into said fluid receiving chamber, thereby preventing entrance of said fluid into said nozzle assembly when the introduction of said fluid into said fluid introduction means is interrupted.

2. An aerosol generator as defined in claim 1 in which said air blower means includes a prime mover and a blower unit operatively connected thereto and to said duct means.

3. An aerosol generator as defined in claim 1 in which said fluid introduction means includes a supply lank for holding the fluid with a first supply conduit extending therefrom, a flow control unit connected to said first supply conduit for pumping fluid out of said tank, and a second supply conduit extending from said flow control unit to said fluid receiving chamber for delivering fluid thereto.

4. An aerosol generator as defined in claim 1 in which said fluid introduction means includes a tank means for holding the fluid having a first supply conduit extending therefrom, a flow control unit connected to said first conduit and operable for pumping fluid out of said tank means with a second supply conduit extending from said flow control unit, valve means connected to said second supply conduit for receiving fluid therefrom, and a third supply conduit extending from said valve means to said nozzle assembly for delivering fluid from said valve means to said fluid receiving chamber.

5. An aerosol generator as defined in claim 4 in which said valve means has a return conduit extending therefrom to said supply tank and also has closed and open positions, said closed position providing communication between said second and third supply conduits and said open position providing communication between said third supply conduit and said return conduit for delivering said fluid back from said fluid introduction means to said tank means.

6. An aerosol generator as defined claim 1 in which said generator includes a plurality of nozzle assemblies connected to said duct means.

7. An aerosol generator as defined in claim 6 in which said fluid introduction means includes a tank means for holding the fluid having a first supply conduit extending therefrom, a flow control unit connected to said first conduit and operable for pumping fluid out of said tank means with a second supply conduit extending from said flow control unit, valve means connected to said second supply conduit for receiving fluid therefrom, and third supply conduit extending from said valve means to said fluid receiving chambers for delivering fluid from said valve means to said nozzle assemblies.

8. An aerosol generator as defined in claim 7 in which said valve means has a return conduit extending therefrom to said supply tank and also has closed and open positions, said closed position providing communication between said second and third supply conduits and said open position providing communication between said third supply conduit and said return conduit means for delivering said fluid back from said fluid introduction means to said tank means.

9. In an aerosol generator for dispersing of fluid in a primary air stream to form a fog having finely divided droplets of said fluid entrained therein, said generator including a prime mover and an air blower means for producing a primary air stream, a duct means having one end connected to said air blower means and an outlet end, a nozzle assembly connected to said outlet end, said nozzle assembly defining an air receiving chamber, said nozzle assembly having a discharge means for discharging said fog, a block enclosed by said nozzle assembly, said block defining a first passage communicating with said air receiving chamber and said discharge means, said block defining a fluid receiving chamber communicating with said first passage and a fluid introduction means for introducing fluid into said fluid receiving chamber for dispersal through said nozzle assembly, wherein the improvement comprises said block defining a second passage communicating between said air receiving chamber and said fluid receiving chamber, said second passage directing a tertiary air stream into said fluid introduction means for preventing entrance of said fluid into said nozzle assembly when the introduction of said fluid into said fluid introduction means is interrupted.

10. An aerosol generator as defined in claim 9 in which said fluid introduction means includes a tank means for holding the fluid having a first supply conduit extending therefrom, a flow control unit connected to said first conduit and operable for pumping fluid out of said tank means with a second supply conduit extending from said flow control unit, valve means connected to said second supply conduit for receiving fluid therefrom, and a third supply conduit extending from said valve means to said nozzle assembly for delivering fluid from said valve means to said fluid receiving chamber.

11. An aerosol generator as defined in claim 10 in which said valve means has a return conduit extending therefrom to said supply tank and also has closed and open positions, said closed position providing communication between said second and third supply conduits and said open position providing communication between said third supply conduit and said return conduit for delivering said fluid back from said fluid introduction means to said tank means.

12. A method of selectively dispersing fluid through a fluid delivery system in a primary air stream to form a fog having finely divided droplets of said fluid entrained therein comprising the steps of (a) moving said primary air stream in at least one inwardly and then outwardly flaring spiral path about a straight axis and into the atmosphere;

(b) moving a secondary air stream through a first passage and simultaneously moving a tertiary air stream through a second passage;

(c) injecting an ultra thin film of said fluid into said primary air stream along said axis to cause said primary air stream to shear said film into finely divided droplets of fluid entrained in said primary air stream for dispensing same; and (d) stopping the flow of said fluid while maintaining the flow of said primary, secondary and tertiary air streams for holding said fluid in said fluid delivery system with said tertiary air stream.

13. A method of dispensing fluid through a fluid delivery system in a primary air stream to form a fog having finely divided droplets of the fluid therein comprising the steps of:

(a) moving the primary air stream in at least one first inwardly and then outwardly flaring spiral path about a straight axis and into the atmosphere;

(b) simultaneously moving a secondary air stream through a first passage along said axis and through said primary air stream into the atmosphere;

(c) injecting the fluid into said secondary air stream at a predetermined rate before it passes through said primary air stream to cause the fog released to the atmosphere to have an outwardly swirling motion; and (d) moving a tertiary air stream through a second passage and into said fluid delivery system to cause at least a partial atomization of said fluid.

14. The method of claim 13 including the additional step of stopping the flow of said fluid while maintaining the flow of said tertiary air stream for holding said fluid in said fluid delivery system.

15. The method of claim 13 including the additional step of stopping the flow of said fluid while maintaining the flow of said primary air stream for holding said fluid in said fluid delivery system.

* * * * *